Patented July 10, 1951

2,560,164

UNITED STATES PATENT OFFICE 2,560,164

FRIEDEL-CRAFTS TREATMENT OF
UNSATURATED POLYMERS

John D. Garber, Cranford, N. J., assignor to
Standard Oil Development Company, a corporation of Delaware No Drawing. Application December 28, 1946,
Serial No. 719,112

8 Claims. (Cl. 260—85.3)

This invention relates to synthetic polymers; relates particularly to methods for the improvement of the physical properties of synthetic polymers; and relates especially to treatment of moderately high molecular weight polymers by a solution of aluminum chloride to increase the melting point and hardness thereof without significant change in molecular weight.

A considerable number of synthetic polymers has been prepared, both by a low temperature technique using Friedel-Crafts catalysts and an emulsion technique using peroxide catalysts, and these polymers show many valuable properties, especially as components of varnishes and paints. However, many of the oil soluble resins so made tend to have undesirably low melting points and tend to be unduly soft.

It is now found that if such polymers are treated with aluminum chloride or other Friedel-Crafts metal halide, an increase in hardness and melting point may be obtained, either with no change in molecular weight, or, in some instances, with a minor increase in molecular weight. Such treated polymers remain soluble in oils and, when mixed with the drying oils, yield faster drying, harder and markedly superior finished coating materials.

The process is particularly applicable to the polymers of a major proportion of a multiolefin having from 4 to about 14 carbon atoms, such as butadiene with a minor proportion of a mono olefin having 3 or more up to about 20 carbon atoms prepared at temperatures between —35° C. and +15° C. Diene copolymers of butadiene, isoprene, dimethyl butadiene, chloroprene, cyclopentadiene, terpenes may be similarly used, as well as poly terpenes, poly isoprene, and other poly dienes. The treatment is also particularly applicable to the oily polymers and copolymers of the multiolefins prepared by an emulsion technique such as in water in the presence of dissolved soap and a dissolved peroxide catalyst in which the character of the polymer is modified by the presence of interfering agents such as the mercaptans to yield an oily polymer or a very soft, semi-solid polymer. The treatment may also be applied to highly unsaturated polymers and to copolymers of dienes and olefins made by sodium polymerization.

Thus the process of the invention increases the melting point, hardness and stability of a polymer containing a high proportion of multiolefins by a treatment with a Friedel-Crafts catalyst in solution. Other objects and details of the invention will be apparent from the following description:

One of the preferred raw materials for the present invention is the low temperature polymer of a major proportion of a multiolefin such as butadiene, isoprene, the terpenes, dimethyl butadiene and the like with a minor proportion of a mono olefin such as propylene, isobutylene, diisobutylene, pentene-2, styrene, and the like. Tertiary base olefins are preferred as comonomers since good yields of soluble products and high catalyst efficiencies are more readily obtained, as shown in the copending applications of Sparks & Thomas, Serial No. 414,682 filed October 11, 1941 (now abandoned); or the application of Garber, Young & Sparks, Serial No. 604,350 filed July 11, 1945; or Serial No. 605,331 filed by Sparks & Garber on July 17, 1945 (now abandoned), or Serial No. 606,445 filed by Tracy on July 21, 1945 (now U. S. Patent 2,554,280), or Serial No. 638,514 filed by Sparks and Garber on December 29, 1945 (now U. S. Patent 2,546,020). These applications show various aspects of the preparation of a low temperature copolymer of a major proportion of a multiolefin such as butadiene with a minor proportion of a normal olefin having from 3 to 20 carbon atoms per molecule or an iso olefin having 5 to 20 carbon atoms per molecule by the use of dissolved aluminum chloride as a catalyst at temperatures ranging from about —35° C. up to about +15° C., and the disclosures of all of these applications are herewith incorporated into and made a part of the present application. This polymerization procedure yields a resin which is not an elastomer. Instead, it is a light-colored, hard resin which is hard enough to show a conchoidal fracture and a melting point usually between +70 and +120° C. (by the ball and ring method). The resulting polymers, as is well shown in the above-mentioned cross references, are readily soluble in the various paint and varnish oils including linseed oil, tung oil, oiticia oil, dehydrated castor oil, and the like, and, when so dissolved may be given the customary varnish cook to yield excellent paint and varnish compounds.

According to the present invention, such resins are dissolved in a low-freezing solvent such as methyl chloride, and while in solution, are treated with a solution of aluminum chloride, $BF_3$, $TiCl_4$, or certain complexes in methyl chloride, or they may be dissolved in a hydrocarbon such as i-pentane and treated with a solution of $AlBr_3$ in isopentane. This treatment does not increase the molecular weight, but does increase the hardness and strength of the resin with only minor changes in solubility. The reaction is conveniently carried out at temperatures within the range between about −50° C. and +100° C., depending upon the solvent chosen, since it is preferable to conduct the reaction at atmospheric pressure and a convenient procedure conducts the reaction at boiling points of the solvent. The reaction is quite rapid and may be complete in from a minute or two to one or two hours and only rarely is the time required greater than two or three hours, although, with certain catalysts and at very low temperatures the reaction may require from 12 to 24 hours. It is essential that too great an excess of catalyst be avoided, since partial insolubilization of the polymer may occur. When the treatment has reached the desired stage, the material may be poured into warm water to vaporize out the methyl chloride and to hydrolyze the aluminum chloride, or the mixture may be poured into warm naphtha to vaporize out the solvent, and then washed with water to obtain a very thorough removal of the aluminum halide residues. The latter procedure is particularly advantageous in view of the fact that the reaction sometimes produces small amounts of insoluble matter, which material is readily filtered out from the naphtha solution. Having filtered the naphtha solution, it is then convenient to make a fractional precipitation of the soluble polymers, by the addition of oxygenated solvents such as alcohols or ethers or aldehydes, the first fraction precipitated showing the highest melting point and the highest strength. By this procedure, the portion first precipitated may be used and subsequent portions may be reprocessed to raise the melting point still higher.

The dry resin is conveniently recovered by flashing off the solvent in a hot coil, as disclosed in Serial No. 662,693, filed April 17, 1946 by Garber, Sparks and Young, now U. S. Patent 2,507,100.

An alternative raw material is an oily multi-olefinic polymer prepared as shown in Serial No. 637,782 filed December 28, 1945 by Frolich, Vanderbilt and Swaney, now U. S. Patent 2,500,983, showing the preparation of an oily or liquid type polymer by an emulsion polymerization process in the presence of an emulsifier, a peroxide catalyst and a polymerization modifier such as an aliphatic mercaptan. This polybutadiene, polyisoprene, polydimethyl butadiene or polypiperylene or the like similarly may be dissolved in a convenient solvent such as ethyl or methyl chloride or propane, pentane or hexane or the like and treated with an aluminum halide in solution, as above indicated, whereupon there is obtained a hard resinous polymer which may be carried to the stage of insolubility, if desired, but is usually stopped at a point where the resulting hard resin is still soluble in spirit and oil solvents; the process being substantially the same as that above pointed out.

The process is applicable to many other soft polymers. Copolymers of dienes such as butadiene, isoprene, dimethyl butadiene, piperlyene with propylene, butenes, isobutylenes, pentenes, cyclohexenes made by polymerizations with sodium are highly satisfactory.

Broadly the process can be applied to any unsaturated polymer. The preferable type of carbon-carbon double bonds are primary (side vinyl) though cyclic, secondary and tertiary double bonds are also reactive. In addition to the hydrocarbon polymers, oxygenated polymers "may be similarly treated." Thus diallyl phthalate either as a monomer or partially polymerized may be hardened by treatment with $BF_3$.

Thus the process of the present invention dissolves a soft or oily type of unsaturated, olefinic polymer in an inert solvent, and treats it, while in solution, with a solution of aluminum chloride or other Friedel-Crafts catalyst to increase the hardness and melting point of the resin without an increase in molecular weight, and without the production of any substantial amount of insoluble material.

The resulting resin is particularly valuable as a varnish gum since it cooks exellently with linseed oil and the other drying and baking oils such as tung, octicia, soybean, dehydrated castor, chia, or unsaturated hydrocarbon drying oils. The treated polymers have many other uses such as in molding compositions with or without fillers, pigments, colorants, dyes, metallic inserts, and the like. They are also good in admixture with rubber for tires, proofed fabrics, motor mountings and the like and also as plasticizers for rubber, admixed with asbestos and a drying oil to make brake linings, in linoleum, etc.

EXAMPLE I

A solution was prepared consisting of an oily butadiene polymer made by the emulsion process above described, in a concentration of 15% in methyl chloride. This solution was then divided into three equal portions, which were respectively treated at −20° C. by varying amounts of a solution of aluminum chloride in methyl chloride in 0.84% concentration, as shown in the following Table 1:

*Table 1*

| Vol. Added of 0.8−$AlCl_3$ | Iodine No. | Melting Point (Bar) | Intrinsic Viscosity |
|---|---|---|---|
| Cc. | | °C. | |
| 0 | 397 | Oil | 0.102 |
| 430 | 327 | 115 | 0.107 |
| 490 | ¹ 243 | 200 | (¹) |

¹ Partially insoluble.

During the treatment the temperature of −20° C. as well as the concentration of polymer and diluent were maintained constant by the use of a reflux condenser cooled by solid carbon dioxide At the close of the reaction period of approximately 20 minutes, the hardening reaction was halted by discharge into a large volume of water.

It will be noted from Table 1 that there was recovered from the solution, upon addition to water, only an oil when no aluminum chloride solution was added, which oil in solution in diisobutylene showed an intrinsic viscosity of 0.102, corresponding to a Staudinger molecular weight value of less than 5,000. It will be further noted that the addition of 430 ccs. of aluminum chloride solution yielded after 20 minutes a precipitate which was a solid having an iodine number (by the Wijs method) of 327, as compared to 397 for the untreated oil; and an intrinsic viscosity in diisobutylene solution of 0.107 indicating a Staudinger molecular weight number of less than 5,000; not significantly different from the molecular weight of the untreated oil. In sharp contrast, the substance recovered from the treated solution showed a melting point (by the ball and ring method) of 115° C., as compared to the original oily polymer which had a melting point below room temperature. Similarly, the use of a small additional amount of aluminum chloride solution brought the iodine number down to about 240, raised the melting point (by the hot bar method) to 200° C., and caused the polymer to become partially insoluble in diisobutylene, thereby preventing the measurement of the molecular weight. It is apparent that in this case the optimum catalyst concentration for a completely soluble product was exceeded, and hence some cross-linking occurred. It is not known whether the insolubilization occurred during the reaction or in subsequent recovery operations.

EXAMPLE 2

A portion of a low temperature butadiene-diisobutylene copolymer containing approximately equal proportions of the two components was prepared by the low temperature polymerization method above disclosed and dissolved in methyl chloride to yield a 35% solution by weight. This solution, containing 800 g. resin and 1,500 g. MeCl, was treated with two portions of aluminum chloride in methyl chloride solution having a concentration of 0.96%, as shown in Tabe 2. Samples were removed at the end of each catalyst addition, water washed and dried as described below:

Table 2

| Sample No. | Total Vol. Added of 0.96 AlCl₃ | Intrinsic Viscosity | Softening Point (Ring and Ball) |
|---|---|---|---|
| 1 | 0 | 0.101 | 72° C. |
| 2 | 75 | 0.110 | 85° C. |
| 3 | 150 | 0.098 | 95° C. |

As in Example 1, the temperature was held at approximately −15° C. by the use of a strongly cooled reflux condenser. After water washing and steam stripping (naphtha solvent) the product was dried at 450° F. As will be evident from the table, the polymer recovered from the solution without treatment by aluminum chloride showed a softening point of 72° C.; the polymer treated with 75 parts of 0.96% of aluminum chloride solution showed a softening point of 85° C., and when treated with 150 parts, a softening point of 95° C.

EXAMPLE 3

Samples of the polymer treated and recovered as in Example 2 were dissolved at "15 gallon length," that is, in an approximately equal weight of linseed oil, and cooked at 560° F. to prepare a varnish composition. Driers to the extent of 0.05% cobalt and 0.5% lead naphthenates were added to each varnish cook after thinning with an equal amount of light naphtha. Films of these varnishes were then cast on panels, some of which were air-dried for 48 hours, and some were baked for one hour at 125° C. The cooking time, the time to dry to a tack-free condition, and the hardness after drying are shown in the following Table 3:

Table 3

| Sample No. | Cooking Time | Drying Time in Hours (Tack-Free) | Sward Hardness Air Dried | Baked |
|---|---|---|---|---|
| | Hours | | | |
| 1 | 6¾ | 4 | 16 | 26 |
| 2 | 8¾ | 3½ | 22 | 34 |
| 3 | 7¼ | 3 | 30 | 50 |

It will be noted that the aluminum chloride treatment sharply reduced the time required for the varnish to dry to a tack-free condition and very substantially increased the hardness; with only minor changes in the required cooking time.

This procedure thus permits of the preparation of a synthetic varnish resin under conditions of minimum cost, and the hardening and improving of that resin to make an extremely effective varnish which dries to films of good strength, good hardness and excellent resistance to deteriorating influences generally. Also, the process permits of a modification of the resins to reduce their reactivity and avoid the tendency towards excessive oxidation and embrittlement during the life of a varnish film prepared therefrom.

EXAMPLE 4

A copolymer of trimethyl ethylene and isoprene was prepared at low temperature by the method above outlined involving the treatment of approximately equal parts of the two monomers in solution in two volumes of methyl chloride; polymerizing the mixture by the application of approximately ½ volume of a 2% solution of aluminum chloride in ethyl chloride; the reaction being conducted at a temperature of approximately −18° C. by external refrigeration. The polymerization was carried by approximately 45% conversion and the reaction mixture was then diluted with approximately two volumes of light naphtha to drive out the unreacted monomers, the diluent and solvent and produce a naphtha solution of polymer. The naphtha solution was then washed in water, dried with calcium chloride and filtered to yield a naphtha solution containing approximately 21% non-volatile material. This solution was then divided up into several portions and the respective portions were treated with a 5% aluminum bromide solution in dry naphtha while vigorously agitated. Varying amounts, as shown in the following Table 4 were used and the reaction was allowed to continue for approximately −30 minutes in each instance. The reaction temperature was maintained at +35° C. by means of a jacket surrounding the reactor. At the end of the treatment time, the various solutions were washed with water, the naphtha stripped out with steam, and the product dried in a vacuum oven. The results are shown in Table 4.

Table 4

| Run # | Volume of Polymer Solution (21%) | Volume of Catalyst Solution (5% AlBr₃) | Softening Point −0° C. (Ring and Ball) | Iodine Number (Wijs) |
|---|---|---|---|---|
| | Cc. | Cc. | | |
| 1 | Control | 0 | 68 | 169 |
| 2 | 100 | 25 | 89 | 151 |
| 3 | 100 | 50 | 113 | 135 |
| 4 | 100 | 100 | 125 | 122 |
| 5 | 100 | 200 | (¹) | (²) |

¹ Did not melt.
² Insoluble.

It will be noted from this table that a very substantial improvement in melting point is obtained together with a sharp reduction in iodine number. The last fraction was highly cross-linked and hence relatively useless in surface coating composition. However, some use as a dispersion coating or in molded objects is indicated.

EXAMPLE 5

A copolymer of 75 parts of butadiene and 25 parts of styrene was prepared in the form of a moderately viscous oil by the emulsion technique above outlined, and after separation from the emulsion form by coagulation, the resulting oil was diluted with three volumes of methyl chloride and treated with one volume of a 2% solution of aluminum chloride in ethyl chloride. The polymer recovered was definitely much more viscous than the original polymer oil. It was purified by washing with water and vacuum drying.

Films of the original oil and the treated oil

| Run # | Catalyst Weight Per Cent Based On Oil | Gardner-Holdt Viscosity | Air Dried (24 Hrs.) Films | | | | Baked (1 Hr. @ 125° C.) Films | | | |
|---|---|---|---|---|---|---|---|---|---|---|
| | | | Water | Soap | Grease | Hardness | Water | Soap | Grease | Hardness |
| 1 | 0 | <A | 8 | 7 | 4 | 8 | 1 | 1 | 0 | 0 |
| 2 | 0.5 | C | 7 | 7 | 4 | 6 | 0 | 1 | 0 | 0 |
| 3 | 1.0 | F | 5 | 3 | 4 | 5 | 0 | 1 | 0 | 0 |
| 4 | 1.5 | R | 1 | 2 | 5 | 1 | 0 | 0 | 0 | 0 | were laid down on sheet metal panels after the addition of 0.05% cobalt naphthenate and 0.5% of lead naphthenate. These panels were then baked for five hours at 150° C.

The unprocessed polymer yielded a film which on baking was extremely brittle and readily flaked off from the panel. In sharp contrast, the treated oil gave a flexible adherent film of high strength and very low brittleness. It is now considered that the difference is due to the reduction in reactivity of the oil by the aluminum chloride treatment and the consequent reduction in the amount of oxidation occurring.

EXAMPLE 6

A butadiene oil was prepared by sodium polymerization and after separation from the catalyst and unchanged monomer, was dissolved in five volumes of methyl chloride; cooled to −20° C., and treated with 5% of aluminum chloride (based on the amount of oil taken) added in the form of a 1% solution in methyl chloride. The reaction was allowed to continue for 15 minutes and was then arrested by the addition of a substantial amount of isopropyl alcohol. The precipitate was found to be not an oil, but a resin having a softening point of 110° C. This product was then dissolved in a sufficient quantity of the original, untreated, oil to make a 20 gallon length varnish. This varnish was cooked at 400° F. until a good, heavy body was obtained, at which point the varnish was thinned with light naphtha, lead and manganese dryers were added, the varnish laid down on metal panels, some of which were air-dried and others baked to yield the following test results:

*Evaluation*

| Film Treatment | Hardness | Water Resistance | Grease Resistance | Solubility In Naphtha |
|---|---|---|---|---|
| Air Dried 24 hrs | 5 | 7 | 7 | Softened markedly. |
| Air Dried 1 wk | 4 | 5 | 3 | Softened slightly. |
| Baked—15 min. @200° C. | 1 | 0 | 0 | Unaffected. |
| Baked—30 min. @150° C. | 1 | 1 | 0 | Do. |

A rating scale of 0 to 9 was used, 0 = unaffected or excellent, 9 = completely removed.

It may be noted that the use of sodium polymerizate as the raw material yielded a markedly superior varnish.

EXAMPLE 7

A substantial portion of sodium-polymerized butadiene containing 10% isobutylene in the copolymer was dissolved in methyl chloride (20% solution) and treated with separate portions of an $AlCl_3$–MeCl catalyst (0.85%) as above. Samples were removed after each catalyst addition, quenched in naphtha, water washed and dried. The final solids content was adjusted to 50% in each case and 0.05% Mn and 0.50% Pb naphthenates added. Films were cast and evaluated as follows:

In the above evaluations, resistances to various reagents is rated from 0 to 9, 0 being unaffected or excellent and 9 being complete removal or very poor.

In the above run the oil was progressively thickened by treatment with $AlCl_3$ until it resembled a cooked varnish. In other words, the resin component was formed in situ, and a varnish composition was prepared without the need of the lengthy cooking operation that is usually required.

Thus the process of the present invention modifies an unsaturated polymer by treatment with a soluble Friedel-Crafts catalyst to reduce the iodine number and increase the melting point without significant change in molecular weight to yield a harder, tougher, more durable varnish either as such or in solution in a vegetable or hydrocarbon drying oil.

While there are above disclosed but a limited number of embodiments of the process and product of the present invention, it is possible to produce still other embodiments without departing from the inventive concept herein disclosed and it is therefore desired that only such limitations be imposed on the appended claims as are stated therein or required by the prior art.

The invention claimed is:

1. The chemical process consisting essentially in dissolving in about 15 to 35% concentration in an inert solvent a viscous to solid moderately high molecular weight polymerization product selected from the group consisting of polymers of a multi-olefin having 4 to 14 carbon atoms, and copolymers of at least 50% of such multi-olefins with a comonomer selected from the group consisting of a mono-olefin having 3 to 20 carbon atoms and styrene, and treating the resulting solution with 0.1% to 10% of a Friedel-Crafts active metal halide catalyst, in the absence of any polymerization monomers, at a temperature of −50° C. to 100° C. to raise the melting point and improve the toughness of said polymerization product without significant change in molecular weight.

2. Process according to claim 1 in which the after-polymerization Friedel-Crafts treatment is carried out at −20° to +35° C.

3. Process according to claim 1 in which the after-polymerization Friedel-Crafts treatment is carried out at about −15° C. to −20° C.

4. The chemical process consisting essentially in dissolving in about 15 to 35% concentration in an inert solvent, a solid, resinous, moderately high molecular weight polymerization product consisting essentially of a copolymer of at least 50% of a multi-olefin of 4 to 6 carbon atoms with not more than 50% of an iso-mono-olefin of 5 to 8 carbon atoms, and treating the resulting solution with 0.1% to 10% of a Friedel-Crafts active metal halide catalyst in the form of a solution thereof in an inert solvent, in the absence of any polymerization monomers, at a temperature of about −20° C. to 35° C., to raise the melting point and improve the toughness of said resinous polymerization product without significant change in its molecular weight.

5. The chemical process consisting essentially in dissolving, in about 15 to 35% concentration, in an inert solvent, a solid, synthetic, hydrocarbon resin product by copolymerization of about equal amounts of butadiene and an iso-mono-olefin of 5 to 8 carbon atoms at −35° C. to 15° C. with a Friedel-Crafts catalyst, said resinous polymerization product having been separated from unreacted monomers and having a melting point of about 70 to 120° C. by the ball and ring method, and treating the resulting solution with 0.1% to 10% of aluminum chloride in the form of a solution thereof in an alkyl chloride of 1 to 2 carbon atoms, in the absence of any polymerization monomers, at a temperature of −20° C. to −35° C., to raise the melting point and improve the toughness of said resinous polymerization product without significant change in its molecular weight.

6. Process according to claim 5 in which the iso-mono-olefin is diisobutylene, and the after-polymerization heating temperature is about −20° C.

7. A tough resinous product derived by chemical treatment of a solid, resinous, polymerization product consisting essentially of a copolymer of at least 50% of a multi-olefin of 4 to 6 carbon atoms with not more than 50% of an iso-mono-olefin of 5 to 8 carbon atoms, said resinous polymerization product having a melting point of about 70 to 120° C. by the ball and ring method, said resinous product having been treated after polymerization, in the absence of any polymerization monomers, in about 15 to 35% concentration in an inert solvent, with 0.1% to 10% of a Friedel-Crafts active metal halide catalyst, at about −20° C. to 35° C. to raise the melting point and improve the toughness of said resinous polymerization product without significant change in its molecular weight.

8. A tough hydrocarbon resin having a melting point of about 95° C. by the ball and ring method, which has been derived by an after-polymerization chemical treatment of a resinous polymerization product having a melting point of about 72° C., and consisting essentially of a copolymer of about equal amounts of butadiene and diisobutylene, said resinous polymerization product having been subjected to an after-polymerization chemical treatment, in solution in about 15 to 35% concentration in an inert solvent, in the absence of any polymerization monomers, with 0.1% to 10% of aluminum chloride, in the form of a solution thereof in an alkyl chloride of 1 to 2 carbon atoms, at a heating temperature of about −20° C.

JOHN D. GARBER.

REFERENCES CITED

The following references are of record in the file of this patent:

UNITED STATES PATENTS

| Number | Name | Date |
| --- | --- | --- |
| 2,122,826 | Van Peski | July 5, 1938 |
| 2,263,915 | Borglin | Nov. 25, 1941 |
| 2,317,858 | Soday | Apr. 27, 1943 |
| 2,390,621 | Shoemaker et al. | Dec. 11, 1945 |
| 2,451,048 | Sparks et al. | Oct. 12, 1948 |